US010862599B2

(12) United States Patent
Tian et al.

(10) Patent No.: US 10,862,599 B2
(45) Date of Patent: Dec. 8, 2020

(54) SYSTEMS AND METHODS FOR APPLYING 4RX CAPABLE UE TESTS TO AN 8RX CAPABLE UE

(71) Applicant: Apple Inc., Cupertino, CA (US)

(72) Inventors: Shuang Tian, Santa Clara, CA (US); Andrey Chervyakov, Nizhny Novgorod (RU); Dmitry Belov, Nizhny Novgorod (RU); Jie Cui, Santa Clara, CA (US); Yang Tang, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/410,562

(22) Filed: May 13, 2019

(65) Prior Publication Data

US 2019/0273569 A1 Sep. 5, 2019

Related U.S. Application Data

(60) Provisional application No. 62/671,336, filed on May 14, 2018.

(51) Int. Cl.
| | |
|---|---|
| *H04B 17/00* | (2015.01) |
| *H04B 17/391* | (2015.01) |
| *H04B 17/21* | (2015.01) |
| *H04B 17/29* | (2015.01) |
| *H04B 7/08* | (2006.01) |

(52) U.S. Cl.
CPC ......... *H04B 17/3911* (2015.01); *H04B 7/082* (2013.01); *H04B 7/0828* (2013.01); *H04B 17/21* (2015.01); *H04B 17/29* (2015.01)

(58) Field of Classification Search
CPC .... H04B 17/3911; H04B 17/21; H04B 17/29; H04B 7/082; H04B 7/0828
USPC .......................................................... 455/67.11
See application file for complete search history.

(56) References Cited

U.S. PATENT DOCUMENTS

| | | | | |
|---|---|---|---|---|
| 7,240,252 | B1 * | 7/2007 | Fessler | H04B 17/345 |
| | | | | 455/67.13 |
| 10,149,225 | B1 * | 12/2018 | Oroskar | H04W 40/12 |
| 10,225,724 | B1 * | 3/2019 | Pawar | H04W 76/10 |
| 10,386,408 | B2 * | 8/2019 | Vis | H04B 17/3911 |
| 2007/0268981 | A1 * | 11/2007 | Heiskala | H04L 1/005 |
| | | | | 375/267 |
| 2011/0299570 | A1 * | 12/2011 | Reed | H04B 17/0085 |
| | | | | 375/130 |
| 2012/0176919 | A1 * | 7/2012 | Callender | H04W 24/00 |
| | | | | 370/252 |

(Continued)

*Primary Examiner* — April G Gonzales
(74) *Attorney, Agent, or Firm* — Stoel Rives LLP

(57) ABSTRACT

Systems and methods provide solutions for testing an 8Rx capable UE using test cases for 4Rx capable UEs. An example method establishes a connection from a first Tx source and a second Tx source to each of 8Rx antenna ports. The connection duplicates a fading channel from both the first Tx source and the second Tx source to each of the eight Rx antenna ports, and adds independent noise for each of the 8Rx antenna ports. One test scenario uses 4Rx supported RF bands by connecting four of the Rx ports with data from a system simulator, and the other four Rx ports are connected with zero input. Same requirements specified with 4Rx capable UEs are applied. Another test scenario uses 8Rx supported RF bands and applies lower dB SNR requirements than those specified for 4Rx tests.

19 Claims, 14 Drawing Sheets

(56) References Cited

U.S. PATENT DOCUMENTS

| | | | |
|---|---|---|---|
| 2013/0170574 A1* | 7/2013 | Fleming | H04B 7/0888 375/267 |
| 2013/0172050 A1* | 7/2013 | Fleming | H04B 7/0874 455/562.1 |
| 2014/0270769 A1* | 9/2014 | Nazarathy | H04J 14/0282 398/65 |
| 2014/0362824 A1* | 12/2014 | Rousu | H04W 28/18 370/331 |
| 2016/0212641 A1* | 7/2016 | Kong | H04B 17/0087 |
| 2018/0176898 A1* | 6/2018 | Yu | H04W 28/06 |
| 2018/0248592 A1* | 8/2018 | Ashrafi | H04L 5/0048 |
| 2019/0115989 A1* | 4/2019 | Rodriguez-Herrera | H04B 17/11 |

* cited by examiner

SYSTEMS AND METHODS FOR APPLYING 4RX CAPABLE UE TESTS TO AN 8RX CAPABLE UE

CROSS-REFERENCE TO RELATED APPLICATIONS

This application claims the benefit under 35 U.S.C. § 119(e) of U.S. Provisional Application No. 62/671,336, filed May 14, 2018, which is hereby incorporated by reference herein in its entirety.

TECHNICAL FIELD

This application relates generally to wireless communication systems, and more specifically to performance testing an 8Rx capable user equipment (UE) including eight receive (8Rx) antenna ports.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (AND SF) server, an enhanced packet data gateway (ePDG) and/or a mobility management entity (MME).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
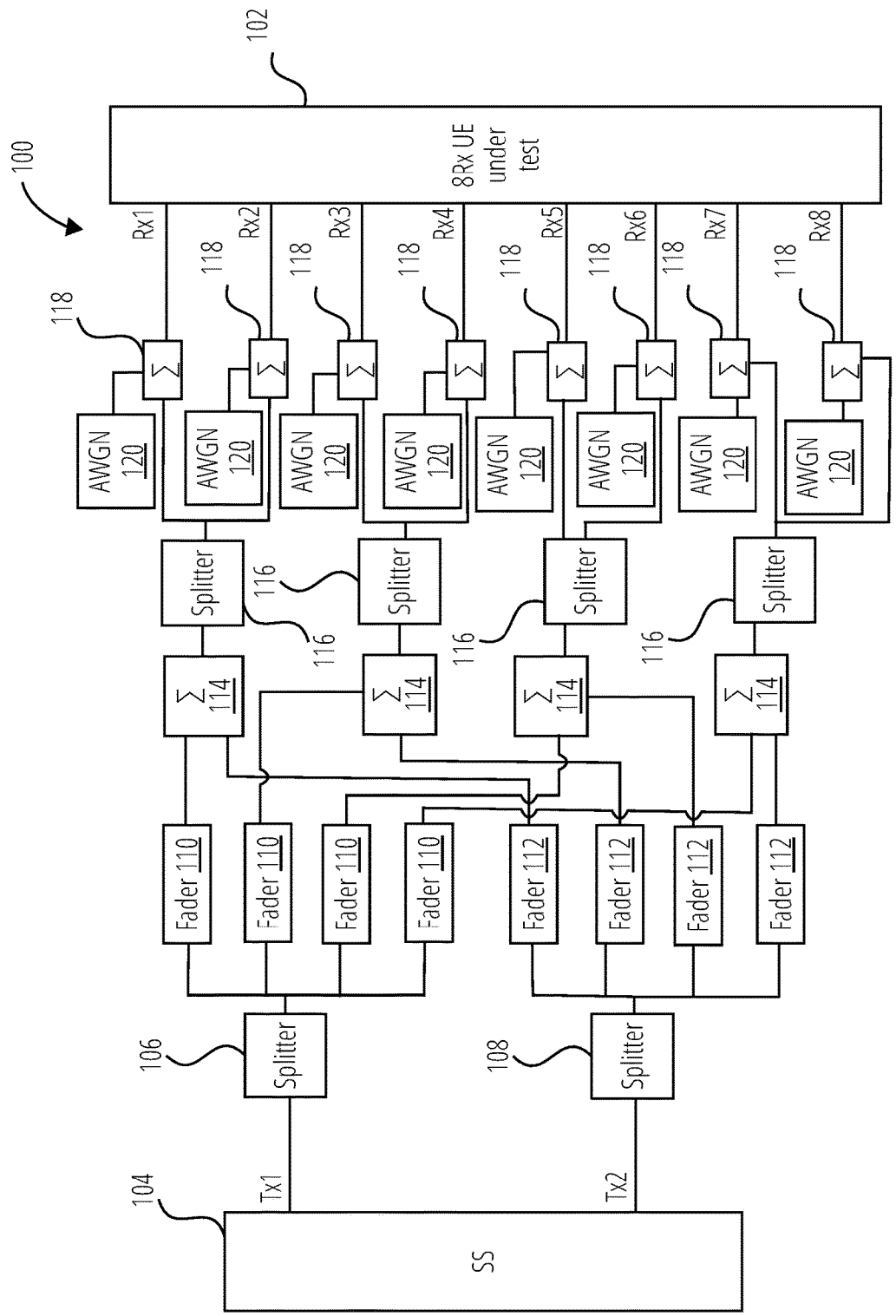
FIG. 1 illustrates an example antenna connection in accordance with one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Recently, Third Generation Partnership Project (3GPP) has discussed a new type of user equipment (UE) that is capable of receiving eight reception layers, which are referred to as "8Rx capable UE." An 8Rx capable UE may be able to support up to eight Multiple Input Multiple Output (MIMO) layers. 3GPP RAN4 has already defined a set of test cases of up to four MIMO layers for 4Rx capable UEs, which can be reused for testing 8Rx capable UEs to support up to four MIMO layers. In order to reuse legacy four reception layer (4Rx) test cases for 8Rx capable UE testing, new applicability rules are needed.

According to various embodiments, for an 8Rx capable UE to be tested in legacy 4Rx tests on any of the 4Rx supported radiofrequency (RF) bands, four out of the 8Rx are connected with data source from the system simulator and the other 4Rx are connected with zero input, depending on UE's declaration and antenna ports configuration. The signal to noise ratio (SNR) requirements can be applied with X decibels (dB) less than the number specified with 4Rx for test configuration with cell-specific reference signal (CRS)- based transmission modes and with X dB less than the number specified with 4Rx for test configuration with demodulation reference signal (DMRS)-based transmission modes. If X=0, for example, the same SNR requirements specified with 4Rx should be applied.

According to various embodiments, for an 8Rx capable UE to be tested in legacy 4Rx tests on any of the 8Rx supported RF bands, the fading channels from the transmit (Tx) antennas are reproduced and independent noise is added to each Rx antenna. The SNR requirements may be applied with Y dB less than the number specified with 4Rx for test configuration with CRS-based transmission modes and with Y dB less than the number specified with 4Rx for test configuration with DMRS-based transmission modes. For example, if Y=1.5 dB, then when an 8Rx capable UE is tested in legacy 4Rx tests on any of the 8Rx supported RF bands, the 8Rx capable UE can achieve 1.5 dB SNR gains compared to the 4Rx capable UEs.

The embodiments herein may allow reuse of legacy 4Rx tests for the new 8Rx capable UE testing. Additionally, the embodiments may simplify the test design and may enhance the coverage of UE functionality/performance tests.

FIG. 1 is a block diagram illustrating an example antenna connection 100 for testing an 8Rx UE under test 102 using 4Rx test cases according to certain embodiments. The example antenna connection 100 connects a system simulator (SS 104) comprising a first Tx antenna port (Tx1) and a second Tx antenna port (Tx2) through connection circuitry to the 8Rx UE under test 102. The connection circuitry of the example antenna connection 100 includes a first splitter 106 coupled to Tx1, a second splitter 108 coupled to Tx2, four first faders 110 coupled to respective outputs of the first splitter 106, and four second faders 112 coupled to respective outputs of the second splitter 108. Four first combiners 114 are respectively coupled to one of the first faders 110 and one of the second faders 112, wherein each of the first faders 110 is coupled to only one of the first combiners 114, and wherein each of the second faders 112 is coupled to only one of the first combiners 114. Four third splitters 116 are respectively coupled to a corresponding output of the four first combiners 114. Eight second combiners 118 are respectively coupled to the outputs of the third splitters 116 to add additive white Gaussian noise (AWGN 120) to each channel coupled to the 8Rx antenna ports (shown as Rx1, Rx2, Rx3, Rx4, Rx5, Rx6, Rx7, Rx8) of the 8Rx UE under test 102. In certain embodiments the AWGN 120 provides independent noise for each of the 8Rx antenna ports.

In one embodiment, the example antenna connection 100 is used to apply the 8Rx UE under test 102 to a legacy 4Rx test case with 2Tx. The SNR requirements may be applied with Y dB less than the number specified with 4Rx for test configuration with CRS-based transmission modes and with Y dB less than the number specified with 4Rx for test configuration with DMRS-based transmission modes. For example, if Y=1.5 dB, then when the 8Rx UE under test 102 is tested in legacy 4Rx tests on any of the 8Rx supported RF bands, the 8Rx UE under test 102 can achieve 1.5 dB SNR gains compared to the 4Rx capable UEs.

In one embodiment, for 8Rx UE under test 102 to be tested in legacy 4Rx tests with 4Tx on any of the 8Rx supported RF bands, the antenna connection can be similarly derived according to FIG. 1 by adding two more Tx chains. The SNR requirements should be applied with Y dB less than the number specified with 4Rx for test configuration with CRS-based transmission modes and with Y dB less than the number specified with 4Rx for test configuration with DMRS-based transmission modes. For example, if Y=1.5 dB, then when the 8Rx UE under test 102 is tested in legacy 4Rx tests on any of the 8Rx supported RF bands, the 8Rx UE under test 102 can achieve 1.5 dB SNR gains compared to the 4Rx capable UEs.

In one embodiment, for the 8Rx UE under test 102 to be tested in legacy 4Rx tests on any of the 4Rx supported RF bands, four out of the 8Rx are connected with data source from the SS 104 and the other 4Rx are connected with zero input, depending on the UE's declaration and antenna ports configuration. In one embodiment, for example, the receive antenna ports Rx1, Rx3, Rx5, and Rx7 are provided with data from the SS 104, while the receive antenna ports Rx2, Rx4, Rx6, and Rx8 are provided with zero input. The zero input may be achieved, for example by switching or disconnecting selected Rx antenna port inputs or by selectively disabling the output of the corresponding second combiners 118. The SNR requirements can be applied with X dB less than the number specified with 4Rx for test configuration with CRS-based transmission modes and with X dB less than the number specified with 4Rx for test configuration with DMRS-based transmission modes. If X=0, then that same SNR requirements specified with 4Rx are applied.

In one embodiment, for the 8Rx UE under test 102 to be tested in legacy 4Rx tests on any of the 8Rx supported RF bands, the fading channels from the Tx antennas are reproduced and independent noise is added to each Rx antenna. The SNR requirements may be applied with Y dB less than the number specified with 4Rx for test configuration with CRS-based transmission modes and with Y dB less than the number specified with 4Rx for test configuration with DMRS-based transmission modes. For example, if Y=1.5 dB, then when the 8Rx UE under test 102 is tested in legacy 4Rx tests on any of the 8Rx supported RF bands, the 8Rx capable UE can achieve 1.5 dB SNR gains compared to the 4Rx capable UEs. In other words, the SNR requirements are applied with 1.5 dB less than the number specified for the 4Rx tests.

In certain embodiments, the applied 4Rx tests may include single carrier demodulation tests on, for example, a physical downlink shared channel (PDSCH), a physical downlink control channel (PDCCH), a physical control format indicator channel (PCFICH), physical channel hybrid automatic repeat request indicator channel (PHICH), and/or enhanced physical downlink control channel (ePDCCH).

Figure 2:
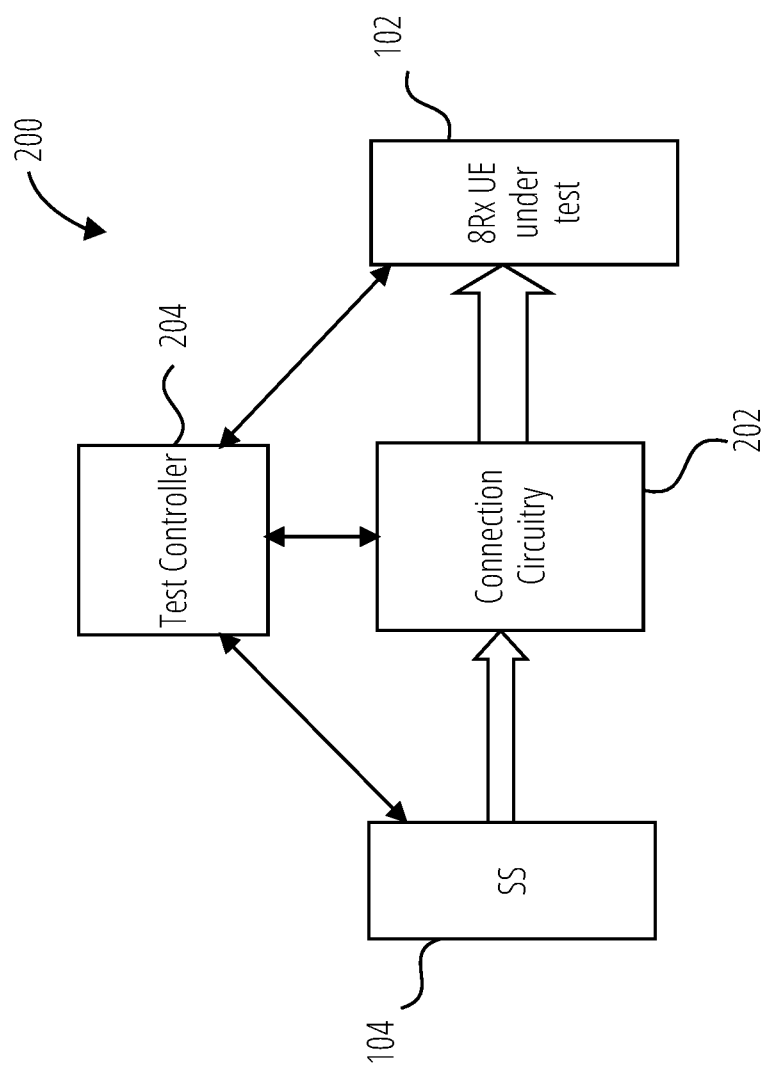
FIG. 2 illustrates a testing apparatus in accordance with one embodiment.

FIG. 2 is a block diagram illustrating testing apparatus 200 for testing an 8Rx UE under test 102 using 4Rx test cases according to certain embodiments. The testing apparatus 200 includes the SS 104 shown in FIG. 1, connection circuitry 202, and a test controller 204. The connection circuitry 202 may include, for example, the first splitter 106, the second splitter 108, the first faders 110, the second faders 112, the first combiners 114, the third splitters 116, the second combiners 118, and the AWGN 120 arranged as shown in FIG. 1. The test controller 204 may include one or more processors and a computer-readable storage medium including instructions that when executed by the one or more processors, cause the one or more processors to perform any of the tests or other methods described herein. The computer-readable storage medium may comprise a non-transitory computer-readable storage medium.

In one embodiment, for example, the test controller 204 may be configured to test the 8Rx UE under test 102 using one or more test cases for 4Rx capable UEs. To perform the one or more tests, the controller may be configured to select a 4Rx supported RF band based on a declaration of the 8Rx capable UE, provide four of the 8Rx antenna ports with data from the SS modulated onto the 4Rx supported RF band and provide zero input to another four of the 8Rx antenna ports, determine one or more performance parameters of the 8Rx capable UE's ability to receive the data on the 4Rx supported RF band, and apply a same set of test criteria specified by the one or more tests for the 4Rx capable UE to measurements of the one or more performance parameters of the 8Rx capable UE's ability to receive the data on the 4Rx supported RF band. The test criteria may include an SNR requirement.

In addition or in other embodiments, to perform the one or more tests, the controller may be configured to select an 8Rx supported RF band based on a declaration of the 8Rx capable UE, provide each of the 8Rx antenna ports with data from the SS modulated onto the 8Rx supported RF band, determine one or more performance parameters of the 8Rx capable UE's ability to receive the data on the 8Rx supported RF band, and apply a signal to noise ratio (SNR) criteria with 1.5 dB less than an SNR requirement specified in the one or more tests for the 4Rx capable UE. In certain embodiments, the one or more tests for the 4Rx capable UE includes a demodulation test.

Figure 3:
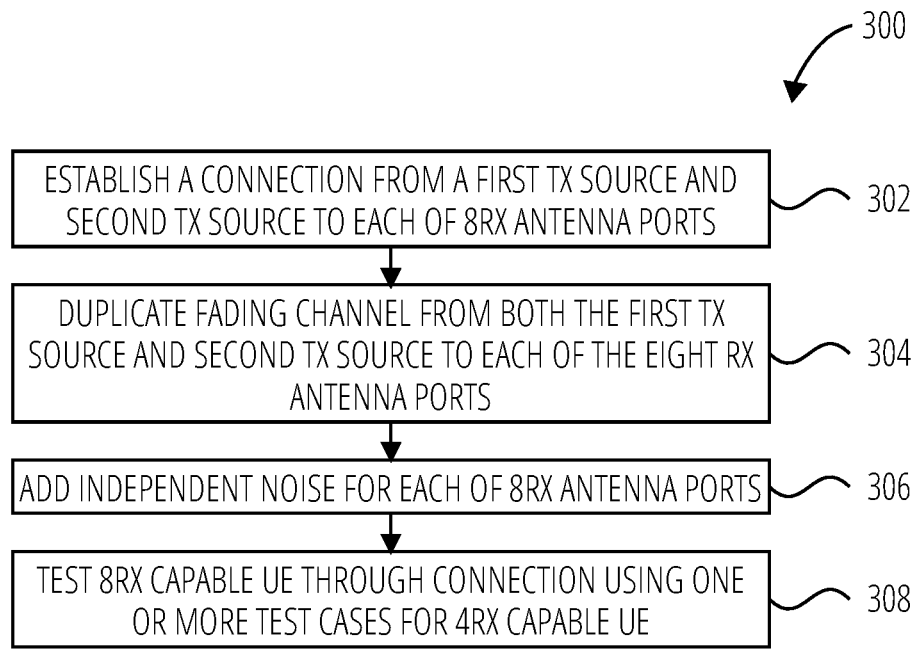
FIG. 3 illustrates a method in accordance with one embodiment.

FIG. 3 is a flowchart illustrating a method 300 for testing an 8Rx capable UE according to one embodiment. In block 302, method 300 establishes a connection from a first Tx source and a second Tx source to each of the 8Rx antenna ports. In block 304, the connection duplicates a fading channel from both the first Tx source and the second Tx source to each of the eight Rx antenna ports. In block 306, the connection adds independent noise for each of the 8Rx antenna ports. In block 308, method 300 tests the 8Rx capable UE through the connection using one or more test cases for a 4Rx capable UE.

Figure 4:
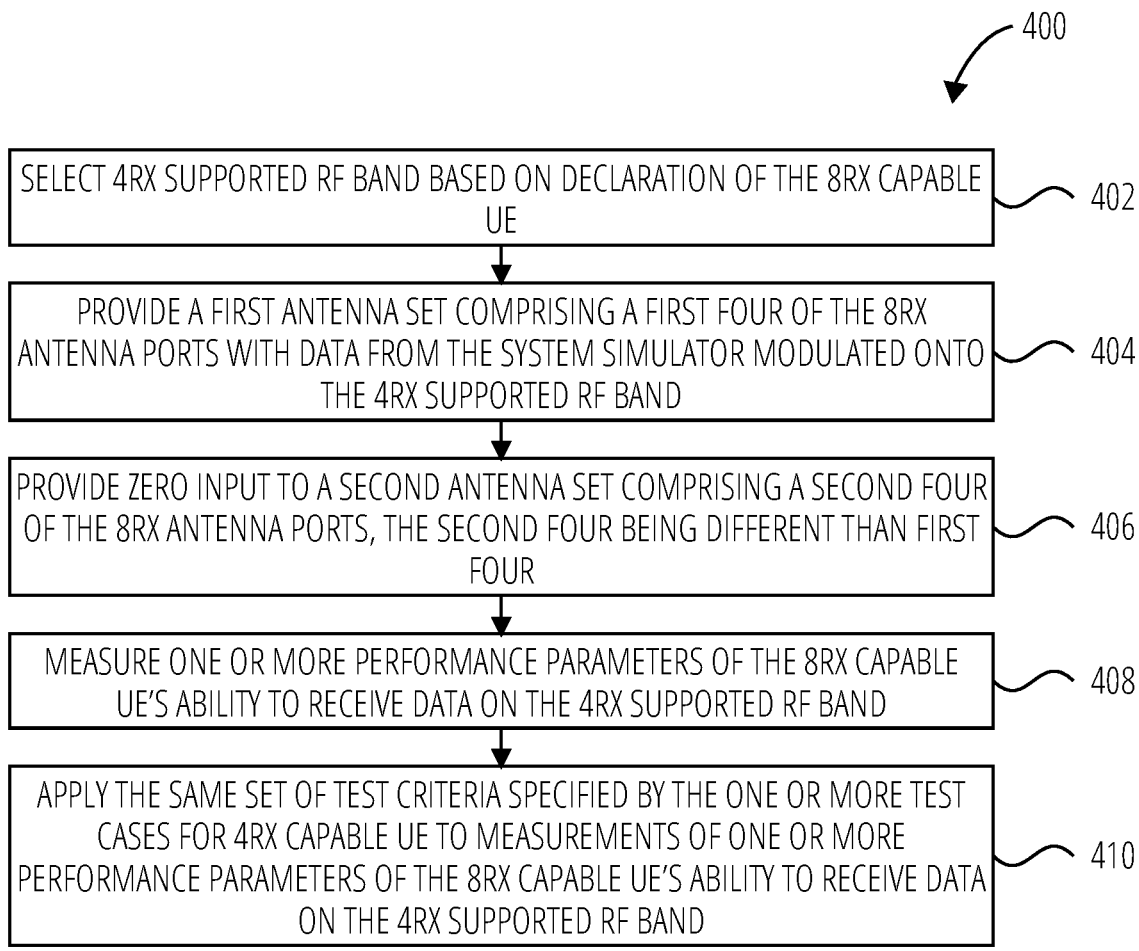
FIG. 4 illustrates a method in accordance with one embodiment.

FIG. 4 is a flowchart illustrating a method 400 for testing an 8Rx capable UE according to another embodiment. The method 400 may be used, for example to perform block 308 shown in FIG. 3. In block 402, method 400 selects a 4Rx supported RF band based on a declaration of the 8Rx capable UE. In block 404, method 400 provides a first antenna set comprising a first four of the 8Rx antenna ports with data from a system simulator modulated onto the 4Rx supported RF band. In block 406, method 400 provides zero input to a second antenna set comprising a second four of the 8Rx antenna ports, the second four being different than the first four. In block 408, method 400 measures one or more performance parameters of the 8Rx capable UE's ability to receive the data on the 4Rx supported RF band. In block 410, method 400 applies a same set of test criteria specified by the one or more test cases for the 4Rx capable UE to measurements of the one or more performance parameters of the 8Rx capable UE's ability to receive the data on the 4Rx supported RF band.

Figure 5:
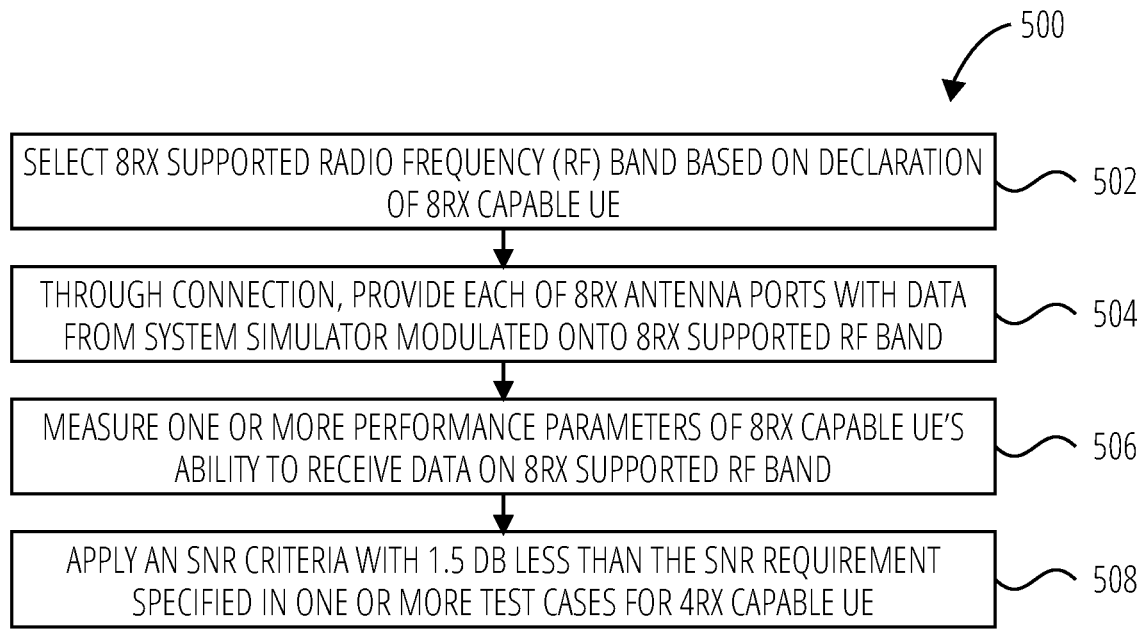
FIG. 5 illustrates a method in accordance with one embodiment.

FIG. 5 is a flowchart illustrating a method 500 for testing an 8Rx capable UE according to another embodiment. the 500 may be used, for example to perform block 308 shown in FIG. 3. In block 502, method 500 selects an 8Rx supported RF band based on a declaration of the 8Rx capable UE. In block 504, method 500 provides each of the 8Rx antenna ports with data from a system simulator modulated onto the 8Rx supported RF band. In block 506, method 500 measures one or more performance parameters of the 8Rx capable UE's ability to receive the data on the 8Rx supported RF band. In block 508, method 500 applies an SNR criteria with 1.5 dB less than the SNR requirement specified in the one or more test cases for the 4Rx capable UE.

Figure 6:
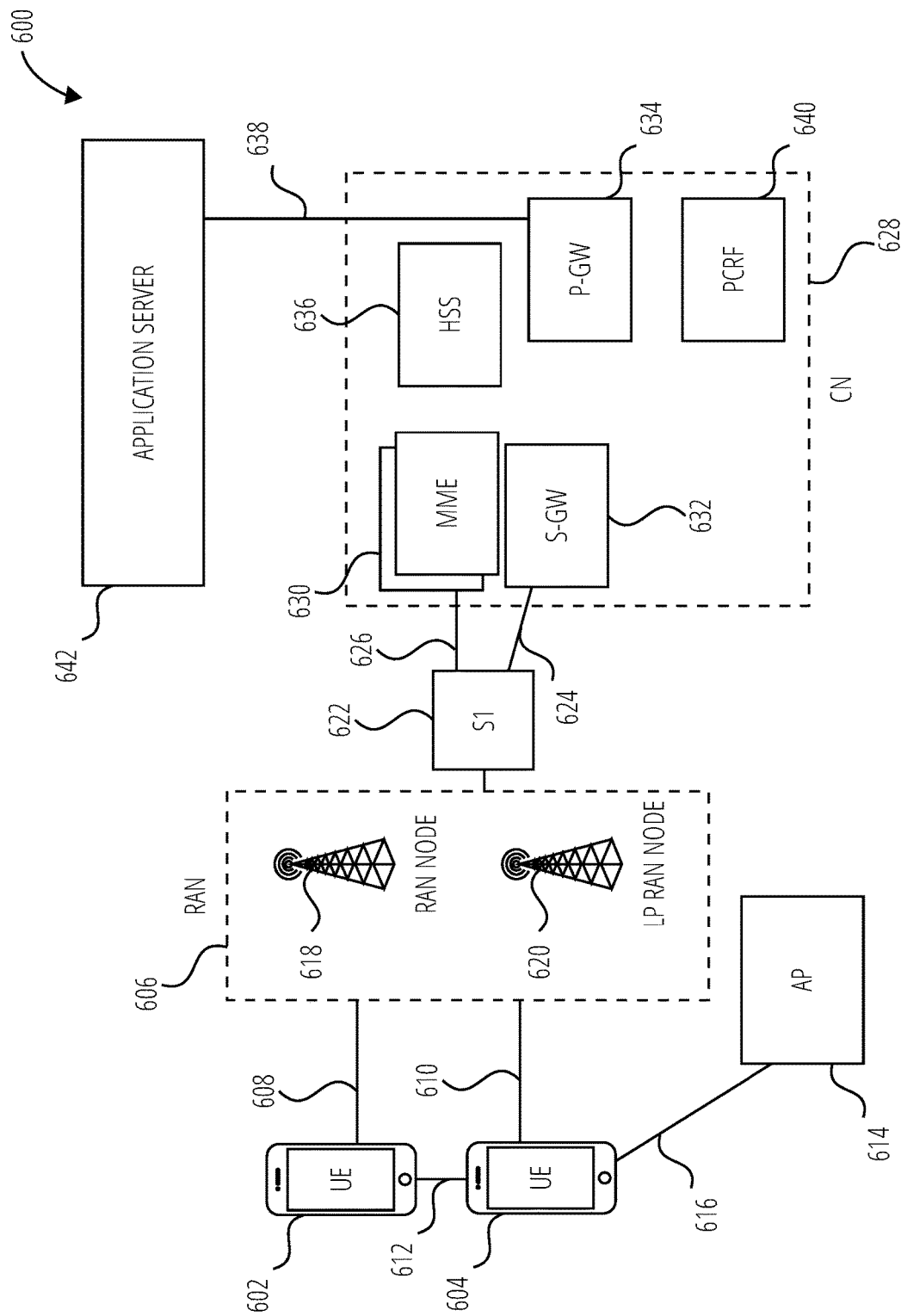
FIG. 6 illustrates a system in accordance with one embodiment.

FIG. 6 illustrates an architecture of a system 600 of a network in accordance with some embodiments. The system 600 includes one or more user equipment (UE), shown in this example as a UE 602 and a UE 604. The UE 602 and the UE 604 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 602 and the UE 604 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 602 and the UE 604 may be configured to connect, e.g., communicatively couple, with a radio access network (RAN), shown as RAN 606. The RAN 606 may be, for example, an Evolved Universal Mobile Telecommunications System (UMTS) Terrestrial Radio Access Network (E-UTRAN), a NextGen RAN (NG RAN), or some other type of RAN. The UE 602 and the UE 604 utilize connection 608 and connection 610, respectively, each of which comprises a physical communications interface or layer (discussed in further detail below); in this example, the connection 608 and the connection 610 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 602 and the UE 604 may further directly exchange communication data via a ProSe interface 612. The ProSe interface 612 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 604 is shown to be configured to access an access point (AP), shown as AP 614, via connection 616. The connection 616 can comprise a local wireless connection, such as a connection consistent with any IEEE 802.11 protocol, wherein the AP 614 would comprise a wireless fidelity (WiFi®) router. In this example, the AP 614 may be connected to the Internet without connecting to the core network of the wireless system (described in further detail below).

The RAN 606 can include one or more access nodes that enable the connection 608 and the connection 610. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 606 may include one or more RAN nodes for providing macrocells, e.g., macro RAN node 618, and one or more RAN nodes for providing femtocells or picocells (e.g., cells having smaller coverage areas, smaller user capacity, or higher bandwidth compared to macrocells), e.g., a low power (LP) RAN node such as LP RAN node 620.

Any of the macro RAN node 618 and the LP RAN node 620 can terminate the air interface protocol and can be the first point of contact for the UE 602 and the UE 604. In some embodiments, any of the macro RAN node 618 and the LP RAN node 620 can fulfill various logical functions for the RAN 606 including, but not limited to, radio network controller (RNC) functions such as radio bearer management, uplink and downlink dynamic radio resource management and data packet scheduling, and mobility management.

In accordance with some embodiments, the UE 602 and the UE 604 can be configured to communicate using Orthogonal Frequency-Division Multiplexing (OFDM) communication signals with each other or with any of the macro RAN node 618 and the LP RAN node 620 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 618 and the LP RAN node 620 to the UE 602 and the UE 604, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 602 and the UE 604. The physical downlink control channel (PDCCH) may carry information about the transport format and resource allocations related to the PDSCH channel, among other things. It may also inform the UE 602 and the UE 604 about the transport format, resource allocation, and H-ARQ (Hybrid Automatic Repeat Request) information related to the uplink shared channel. Typically, downlink scheduling (assigning control and shared channel resource blocks to the UE 604 within a cell) may be performed at any of the macro RAN node 618 and the LP RAN node 620 based on channel quality information fed back from any of the UE 602 and UE 604. The downlink resource assignment information may be sent on the PDCCH used for (e.g., assigned to) each of the UE 602 and the UE 604.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 606 is communicatively coupled to a core network (CN), shown as CN 628—via an S1 interface 622. In embodiments, the CN 628 may be an evolved packet core (EPC) network, a NextGen Packet Core (NPC) network, or some other type of CN. In this embodiment the S1 interface 622 is split into two parts: the S1-U interface 624, which carries traffic data between the macro RAN node 618 and the LP RAN node 620 and a serving gateway (S-GW), shown as S-GW 632, and an S1-mobility management entity (MME) interface, shown as S1-MME interface 626, which is a signaling interface between the macro RAN node 618 and LP RAN node 620 and the MME(s) 630.

In this embodiment, the CN 628 comprises the MME(s) 630, the S-GW 632, a Packet Data Network (PDN) Gateway (P-GW) (shown as P-GW 634), and a home subscriber server (HSS) (shown as HSS 636). The MME(s) 630 may be similar in function to the control plane of legacy Serving General Packet Radio Service (GPRS) Support Nodes (SGSN). The MME(s) 630 may manage mobility aspects in access such as gateway selection and tracking area list management. The HSS 636 may comprise a database for network users, including subscription-related information to support the network entities' handling of communication sessions. The CN 628 may comprise one or several HSS 636, depending on the number of mobile subscribers, on the capacity of the equipment, on the organization of the network, etc. For example, the HSS 636 can provide support for routing/roaming, authentication, authorization, naming/addressing resolution, location dependencies, etc.

The S-GW 632 may terminate the S1 interface 322 towards the RAN 606, and routes data packets between the RAN 606 and the CN 628. In addition, the S-GW 632 may be a local mobility anchor point for inter-RAN node handovers and also may provide an anchor for inter-3GPP mobility. Other responsibilities may include lawful intercept, charging, and some policy enforcement.

The P-GW 634 may terminate an SGi interface toward a PDN. The P-GW 634 may route data packets between the CN 628 (e.g., an EPC network) and external networks such as a network including the application server 642 (alternatively referred to as application function (AF)) via an Internet Protocol (IP) interface (shown as IP communications interface 638). Generally, an application server 642 may be an element offering applications that use IP bearer resources with the core network (e.g., UMTS Packet Services (PS) domain, LTE PS data services, etc.). In this embodiment, the P-GW 634 is shown to be communicatively coupled to an application server 642 via an IP communications interface 638. The application server 642 can also be configured to support one or more communication services (e.g., Voice-over-Internet Protocol (VoIP) sessions, PTT sessions, group communication sessions, social networking services, etc.) for the UE 602 and the UE 604 via the CN 628.

The P-GW 634 may further be a node for policy enforcement and charging data collection. A Policy and Charging Enforcement Function (PCRF) (shown as PCRF 640) is the policy and charging control element of the CN 628. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 640 may be communicatively coupled to the application server 642 via the P-GW 634. The application server 642 may signal the PCRF 640 to indicate a new service flow and select the appropriate Quality of Service (QoS) and charging parameters. The PCRF 640 may provision this rule into a Policy and Charging Enforcement Function (PCEF) (not shown) with the appropriate traffic flow template (TFT) and QoS class of identifier (QCI), which commences the QoS and charging as specified by the application server 642.

Figure 7:
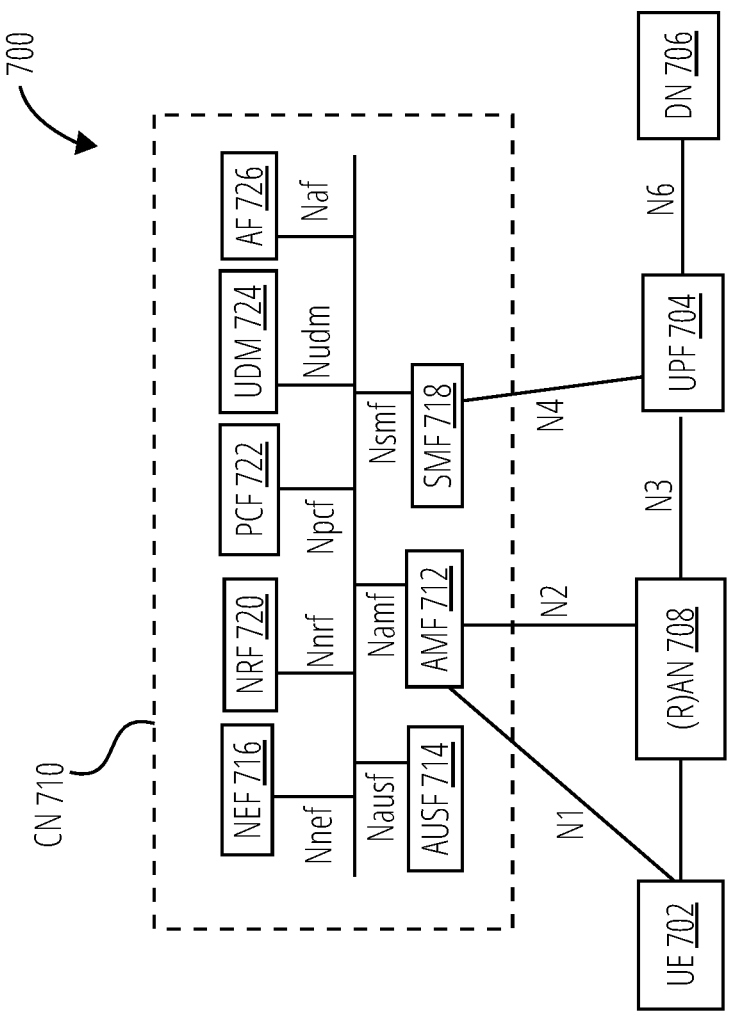
FIG. 7 illustrates a system in accordance with one embodiment.

FIG. 7 illustrates an architecture of a system 700 of a network in accordance with some embodiments. The system 700 is shown to include a UE 702, which may be the same or similar to the UE 602 and the UE 604 discussed previously; a 5G access node or RAN node (shown as (R)AN node 708), which may be the same or similar to the macro RAN node 618 and/or the LP RAN node 620 discussed previously; a User Plane Function (shown as UPF 704); a Data Network (DN 706), which may be, for example, operator services, Internet access or 3rd party services; and a 5G Core Network (5GC) (shown as CN 710).

The CN 710 may include an Authentication Server Function (AUSF 714); a Core Access and Mobility Management Function (AMF 712); a Session Management Function (SMF 718); a Network Exposure Function (NEF 716); a Policy Control Function (PCF 722); a Network Function (NF) Repository Function (NRF 720); a Unified Data Management (UDM 724); and an Application Function (AF 726). The CN 710 may also include other elements that are not shown, such as a Structured Data Storage network function (SDSF), an Unstructured Data Storage network function (UDSF), and the like.

The UPF 704 may act as an anchor point for intra-RAT and inter-RAT mobility, an external PDU session point of interconnect to DN 706, and a branching point to support multi-homed PDU session. The UPF 704 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 704 may include an uplink classifier to support routing traffic flows to a data network. The DN 706 may represent various network operator services, Internet access, or third party services. DN 706 may include, or be similar to the application server 642 discussed previously.

The AUSF 714 may store data for authentication of UE 702 and handle authentication related functionality. The AUSF 714 may facilitate a common authentication framework for various access types.

The AMF 712 may be responsible for registration management (e.g., for registering UE 702, etc.), connection management, reachability management, mobility management, and lawful interception of AMF-related events, and access authentication and authorization. AMF 712 may provide transport for SM messages for the SMF 718, and act as a transparent proxy for routing SM messages. AMF 712 may also provide transport for short message service (SMS) messages between UE 702 and an SMS function (SMSF) (not shown by FIG. 7). AMF 712 may act as Security Anchor Function (SEA), which may include interaction with the AUSF 714 and the UE 702, receipt of an intermediate key that was established as a result of the UE 702 authentication process. Where USIM based authentication is used, the AMF 712 may retrieve the security material from the AUSF 714. AMF 712 may also include a Security Context Management (SCM) function, which receives a key from the SEA that it uses to derive access-network specific keys. Furthermore, AMF 712 may be a termination point of RAN CP interface (N2 reference point), a termination point of NAS (NI) signaling, and perform NAS ciphering and integrity protection.

AMF 712 may also support NAS signaling with a UE 702 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control☐plane NAS (NI) signaling between the UE 702 and AMF 712, and relay uplink and downlink user-plane packets between the UE 702 and UPF 704. The N3IWF also provides mechanisms for IPsec tunnel establishment with the UE 702.

The SMF 718 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 718 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 716 may provide means for securely exposing the services and capabilities provided by 3GPP network functions for third party, internal exposure/re-exposure, Application Functions (e.g., AF 726), edge computing or fog computing systems, etc. In such embodiments, the NEF 716 may authenticate, authorize, and/or throttle the AFs. NEF 716 may also translate information exchanged with the AF 726 and information exchanged with internal network functions. For example, the NEF 716 may translate between an AF-Service-Identifier and an internal 5GC information. NEF 716 may also receive information from other network functions (NFs) based on exposed capabilities of other network functions. This information may be stored at the NEF 716 as structured data, or at a data storage NF using a standardized interfaces. The stored information can then be re-exposed by the NEF 716 to other NFs and AFs, and/or used for other purposes such as analytics.

The NRF 720 may support service discovery functions, receive NF Discovery Requests from NF instances, and provide the information of the discovered NF instances to the NF instances. NRF 720 also maintains information of available NF instances and their supported services.

The PCF 722 may provide policy rules to control plane function(s) to enforce them, and may also support unified policy framework to govern network behavior. The PCF 722 may also implement a front end (FE) to access subscription information relevant for policy decisions in a UDR of UDM 724.

The UDM 724 may handle subscription-related information to support the network entities' handling of communication sessions, and may store subscription data of UE 702. The UDM 724 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 722. UDM 724 may also support SMS management, wherein an SMS-FE implements the similar application logic as discussed previously.

The AF 726 may provide application influence on traffic routing, access to the Network Capability Exposure (NCE), and interact with the policy framework for policy control. The NCE may be a mechanism that allows the 5GC and AF 726 to provide information to each other via NEF 716, which may be used for edge computing implementations. In such implementations, the network operator and third party services may be hosted close to the UE 702 access point of attachment to achieve an efficient service delivery through the reduced end-to-end latency and load on the transport network. For edge computing implementations, the 5GC may select a UPF 704 close to the UE 702 and execute traffic steering from the UPF 704 to DN 706 via the N6 interface. This may be based on the UE subscription data, UE location, and information provided by the AF 726. In this way, the AF 726 may influence UPF (re)selection and traffic routing. Based on operator deployment, when AF 726 is considered to be a trusted entity, the network operator may permit AF 726 to interact directly with relevant NFs.

As discussed previously, the CN 710 may include an SMSF, which may be responsible for SMS subscription checking and verification, and relaying SM messages to/from the UE 702 to/from other entities, such as an SMS□GMSC/IWMSC/SMS-router. The SMS may also interact with AMF 712 and UDM 724 for notification procedure that the UE 702 is available for SMS transfer (e.g., set a UE not reachable flag, and notifying UDM 724 when UE 702 is available for SMS).

The system 700 may include the following service-based interfaces: Namf: Service-based interface exhibited by AMF; Nsmf: Service-based interface exhibited by SMF; Nnef: Service-based interface exhibited by NEF; Npcf: Service□based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 700 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 710 may include an Nx interface, which is an inter-CN interface between the MME (e.g., MME(s) 630) and the AMF 712 in order to enable interworking between CN 710 and CN 628.

Although not shown by FIG. 7, the system 700 may include multiple RAN nodes (such as (R)AN node 708) wherein an Xn interface is defined between two or more (R)AN node 708 (e.g., gNBs and the like) that connecting to 5GC 410, between a (R)AN node 708 (e.g., gNB) connecting to CN 710 and an eNB (e.g., a macro RAN node 618 of FIG. 6), and/or between two eNBs connecting to CN 710.

In some implementations, the Xn interface may include an Xn user plane (Xn□U) interface and an Xn control plane (Xn-C) interface. The Xn-U may provide non□guaranteed delivery of user plane PDUs and support/provide data forwarding and flow control functionality. The Xn-C may provide management and error handling functionality, functionality to manage the Xn-C interface; mobility support for UE 702 in a connected mode (e.g., CM-CONNECTED) including functionality to manage the UE mobility for connected mode between one or more (R)AN node 708. The mobility support may include context transfer from an old (source) serving (R)AN node 708 to new (target) serving (R)AN node 708; and control of user plane tunnels between old (source) serving (R)AN node 708 to new (target) serving (R)AN node 708.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
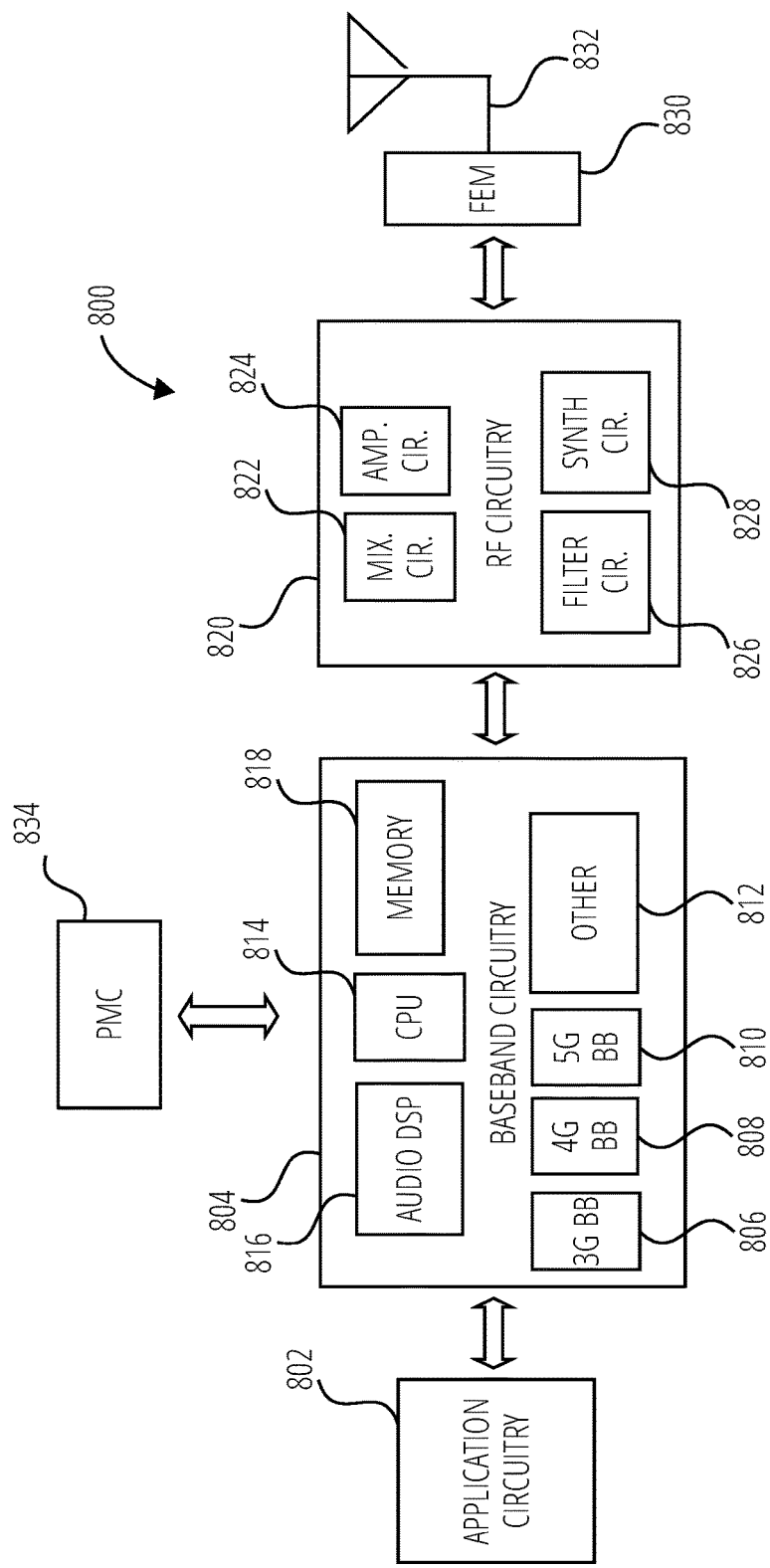
FIG. 8 illustrates a device in accordance with one embodiment.

FIG. 8 illustrates example components of a device 800 in accordance with some embodiments. In some embodiments, the device 800 may include application circuitry 802, baseband circuitry 804, Radio Frequency (RF) circuitry (shown as RF circuitry 820), front-end module (FEM) circuitry (shown as FEM circuitry 830), one or more antennas 832, and power management circuitry (PMC) (shown as PMC 834) coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 820 and to generate baseband signals for a transmit signal path of the RF circuitry 820. The baseband circuitry 804 may interface with the application circuitry 802 for generation and processing of the baseband signals and for controlling operations of the RF circuitry 820. For example, in some embodiments, the baseband circuitry 804 may include a third generation (3G) baseband processor (3G baseband processor 806), a fourth generation (4G) baseband processor (4G baseband processor 808), a fifth generation (5G) baseband processor (5G baseband processor 810), or other baseband processor(s) 812 for other existing generations, generations in development or to be developed in the future (e.g., second generation (2G), sixth generation (6G), etc.). The baseband circuitry 804 (e.g., one or more of baseband processors) may handle various radio control functions that enable communication with one or more radio networks via the RF circuitry 820. In other embodiments, some or all of the functionality of the illustrated baseband processors may be included in modules stored in the memory 818 and executed via a Central Processing Unit (CPU 814). The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include a digital signal processor (DSP), such as one or more audio DSP(s) 816. The one or more audio DSP(s) 816 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 820 may enable communication with wireless networks using modulated electromagnetic radiation through a non-solid medium. In various embodiments, the RF circuitry 820 may include switches, filters, amplifiers, etc. to facilitate the communication with the wireless network. The RF circuitry 820 may include a receive signal path which may include circuitry to down-convert RF signals received from the FEM circuitry 830 and provide baseband signals to the baseband circuitry 804. The RF circuitry 820 may also include a transmit signal path which may include circuitry to up-convert baseband signals provided by the baseband circuitry 804 and provide RF output signals to the FEM circuitry 830 for transmission.

In some embodiments, the receive signal path of the RF circuitry 820 may include mixer circuitry 822, amplifier circuitry 824 and filter circuitry 826. In some embodiments, the transmit signal path of the RF circuitry 820 may include filter circuitry 826 and mixer circuitry 822. The RF circuitry 820 may also include synthesizer circuitry 828 for synthesizing a frequency for use by the mixer circuitry 822 of the receive signal path and the transmit signal path. In some embodiments, the mixer circuitry 822 of the receive signal path may be configured to down-convert RF signals received from the FEM circuitry 830 based on the synthesized frequency provided by synthesizer circuitry 828. The amplifier circuitry 824 may be configured to amplify the down-converted signals and the filter circuitry 826 may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 822 of the receive signal path may comprise passive mixers, although the scope of the embodiments is not limited in this respect.

In some embodiments, the mixer circuitry 822 of the transmit signal path may be configured to up-convert input baseband signals based on the synthesized frequency provided by the synthesizer circuitry 828 to generate RF output signals for the FEM circuitry 830. The baseband signals may be provided by the baseband circuitry 804 and may be filtered by the filter circuitry 826.

In some embodiments, the mixer circuitry 822 of the receive signal path and the mixer circuitry 822 of the transmit signal path may include two or more mixers and may be arranged for quadrature downconversion and upconversion, respectively. In some embodiments, the mixer circuitry 822 of the receive signal path and the mixer circuitry 822 of the transmit signal path may include two or more mixers and may be arranged for image rejection (e.g., Hartley image rejection). In some embodiments, the mixer circuitry 822 of the receive signal path and the mixer circuitry 822 may be arranged for direct downconversion and direct upconversion, respectively. In some embodiments, the mixer circuitry 822 of the receive signal path and the mixer circuitry 822 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 820 may include analog-to-digital converter (ADC) and digital-to-analog converter (DAC) circuitry and the baseband circuitry 804 may include a digital baseband interface to communicate with the RF circuitry 820.

In some dual-mode embodiments, a separate radio IC circuitry may be provided for processing signals for each spectrum, although the scope of the embodiments is not limited in this respect.

In some embodiments, the synthesizer circuitry 828 may be a fractional-N synthesizer or a fractional N/N+1 synthesizer, although the scope of the embodiments is not limited in this respect as other types of frequency synthesizers may be suitable. For example, synthesizer circuitry 828 may be a delta-sigma synthesizer, a frequency multiplier, or a synthesizer comprising a phase-locked loop with a frequency divider.

The synthesizer circuitry 828 may be configured to synthesize an output frequency for use by the mixer circuitry 822 of the RF circuitry 820 based on a frequency input and a divider control input. In some embodiments, the synthesizer circuitry 828 may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 828 of the RF circuitry 820 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 828 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 820 may include an IQ/polar converter.

The FEM circuitry 830 may include a receive signal path which may include circuitry configured to operate on RF signals received from one or more antennas 832, amplify the received signals and provide the amplified versions of the received signals to the RF circuitry 820 for further processing. The FEM circuitry 830 may also include a transmit signal path which may include circuitry configured to amplify signals for transmission provided by the RF circuitry 820 for transmission by one or more of the one or more antennas 832. In various embodiments, the amplification through the transmit or receive signal paths may be done solely in the RF circuitry 820, solely in the FEM circuitry 830, or in both the RF circuitry 820 and the FEM circuitry 830.

In some embodiments, the FEM circuitry 830 may include a TX/RX switch to switch between transmit mode and receive mode operation. The FEM circuitry 830 may include a receive signal path and a transmit signal path. The receive signal path of the FEM circuitry 830 may include an LNA to amplify received RF signals and provide the amplified received RF signals as an output (e.g., to the RF circuitry 820). The transmit signal path of the FEM circuitry 830 may include a power amplifier (PA) to amplify input RF signals (e.g., provided by the RF circuitry 820), and one or more filters to generate RF signals for subsequent transmission (e.g., by one or more of the one or more antennas 832).

In some embodiments, the PMC 834 may manage power provided to the baseband circuitry 804. In particular, the PMC 834 may control power-source selection, voltage scaling, battery charging, or DC-to-DC conversion. The PMC 834 may often be included when the device 800 is capable of being powered by a battery, for example, when the device 800 is included in a UE. The PMC 834 may increase the power conversion efficiency while providing desirable implementation size and heat dissipation characteristics.

FIG. 8 shows the PMC 834 coupled only with the baseband circuitry 804. However, in other embodiments, the PMC 834 may be additionally or alternatively coupled with, and perform similar power management operations for, other components such as, but not limited to, the application circuitry 802, the RF circuitry 820, or the FEM circuitry 830.

In some embodiments, the PMC 834 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
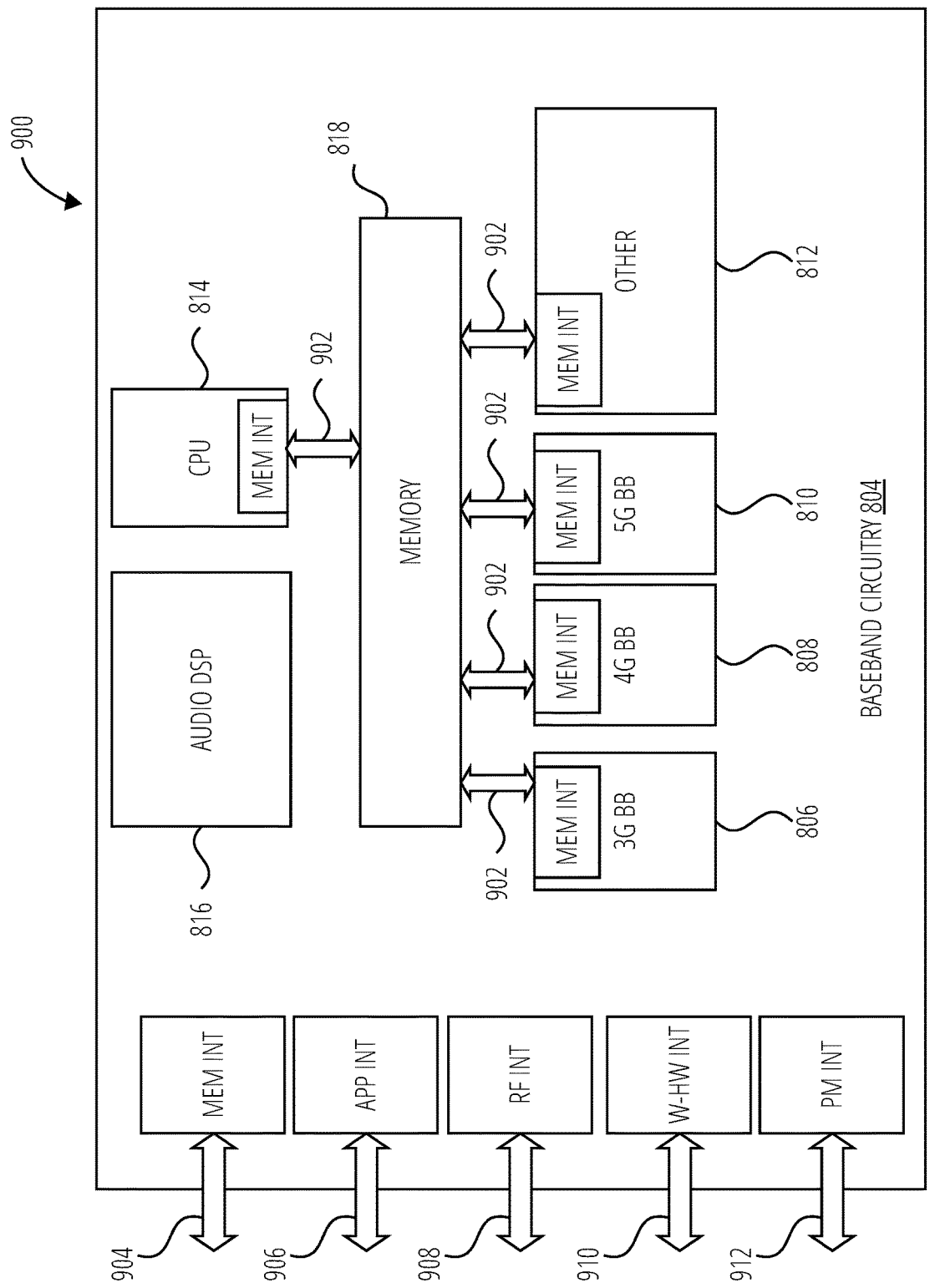
FIG. 9 illustrates an example interfaces in accordance with one embodiment.

FIG. 9 illustrates example interfaces 900 of baseband circuitry in accordance with some embodiments. As discussed above, the baseband circuitry 804 of FIG. 8 may comprise 3G baseband processor 806, 4G baseband processor 808, 5G baseband processor 810, other baseband processor(s) 812, CPU 814, and a memory 818 utilized by said processors. As illustrated, each of the processors may include a respective memory interface 902 to send/receive data to/from the memory 818.

The baseband circuitry 804 may further include one or more interfaces to communicatively couple to other circuitries/devices, such as a memory interface 904 (e.g., an interface to send/receive data to/from memory external to the baseband circuitry 804), an application circuitry interface 906 (e.g., an interface to send/receive data to/from the application circuitry 802 of FIG. 8), an RF circuitry interface 908 (e.g., an interface to send/receive data to/from RF circuitry 820 of FIG. 8), a wireless hardware connectivity interface 910 (e.g., an interface to send/receive data to/from Near Field Communication (NFC) components, Bluetooth® components (e.g., Bluetooth® Low Energy), Wi-Fi® components, and other communication components), and a power management interface 912 (e.g., an interface to send/receive power or control signals to/from the PMC 834.

Figure 10:
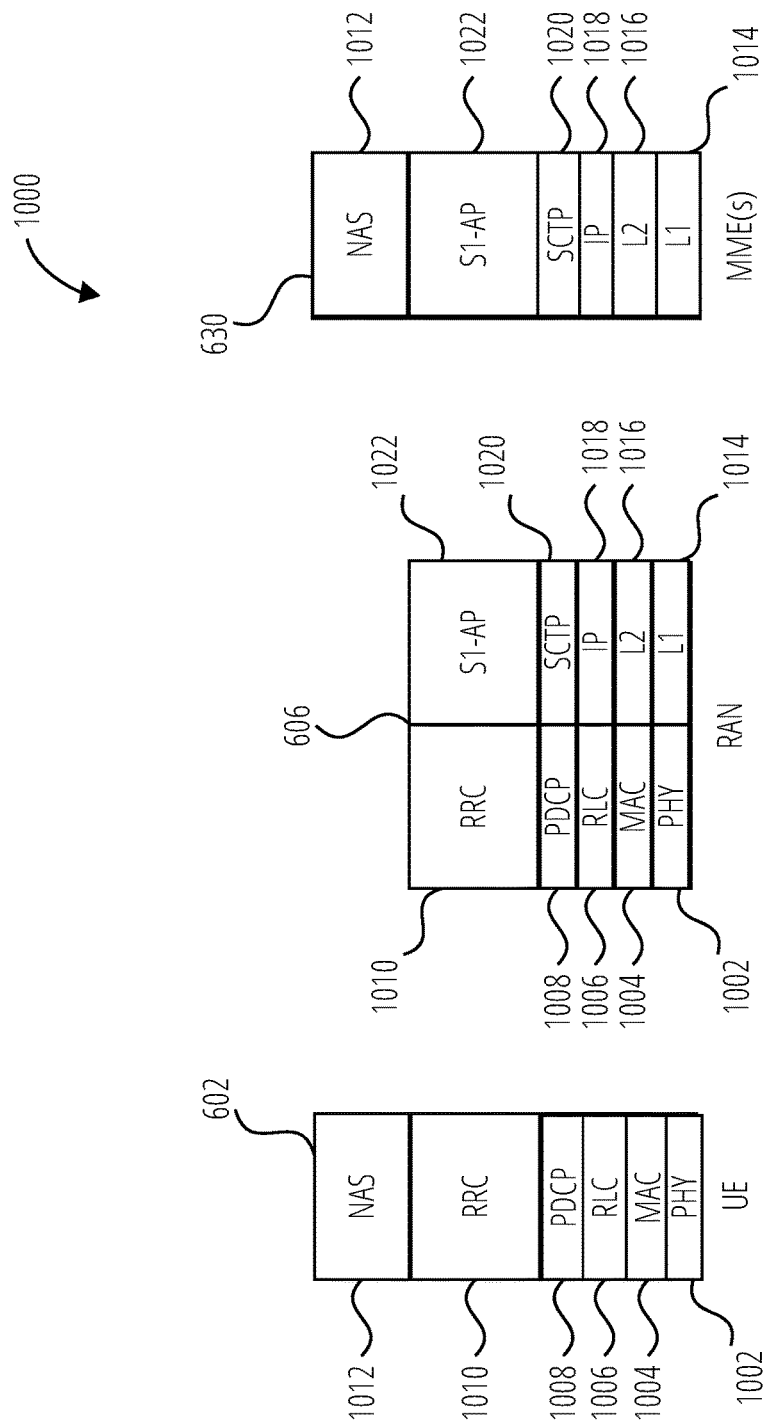
FIG. 10 illustrates a control plane in accordance with one embodiment.

FIG. 10 is an illustration of a control plane protocol stack in accordance with some embodiments. In this embodiment, a control plane 1000 is shown as a communications protocol stack between the UE 602 (or alternatively, the UE 604), the RAN 606 (e.g., the macro RAN node 618 and/or the LP RAN node 620), and the MME(s) 630.

A PHY layer 1002 may transmit or receive information used by the MAC layer 1004 over one or more air interfaces. The PHY layer 1002 may further perform link adaptation or adaptive modulation and coding (AMC), power control, cell search (e.g., for initial synchronization and handover purposes), and other measurements used by higher layers, such as an RRC layer 1010. The PHY layer 1002 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1004 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 1006 may operate in a plurality of modes of operation, including: Transparent Mode (TM), Unacknowledged Mode (UM), and Acknowledged Mode (AM). The RLC layer 1006 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1006 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1008 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1010 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 602 and the RAN 606 may utilize a Uu interface (e.g., an LTE-Uu interface) to exchange control plane data via a protocol stack comprising the PHY layer 1002, the MAC layer 1004, the RLC layer 1006, the PDCP layer 1008, and the RRC layer 1010.

In the embodiment shown, the non-access stratum (NAS) protocols (NAS protocols 1012) form the highest stratum of the control plane between the UE 602 and the MME(s) 630. The NAS protocols 1012 support the mobility of the UE 602 and the session management procedures to establish and maintain IP connectivity between the UE 602 and the P-GW 634.

The S1 Application Protocol (S1-AP) layer (S1-AP layer 1022) may support the functions of the S1 interface and comprise Elementary Procedures (EPs). An EP is a unit of interaction between the RAN 606 and the CN 628. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 1020) may ensure reliable delivery of signaling messages between the RAN 606 and the MME(s) 630 based, in part, on the IP protocol, supported by an IP layer 1018. An L2 layer 1016 and an L1 layer 1014 may refer to communication links (e.g., wired or wireless) used by the RAN node and the MME to exchange information.

The RAN 606 and the MME(s) 630 may utilize an S1-MME interface to exchange control plane data via a protocol stack comprising the L1 layer 1014, the L2 layer 1016, the IP layer 1018, the SCTP layer 1020, and the S1-AP layer 1022.

Figure 11:
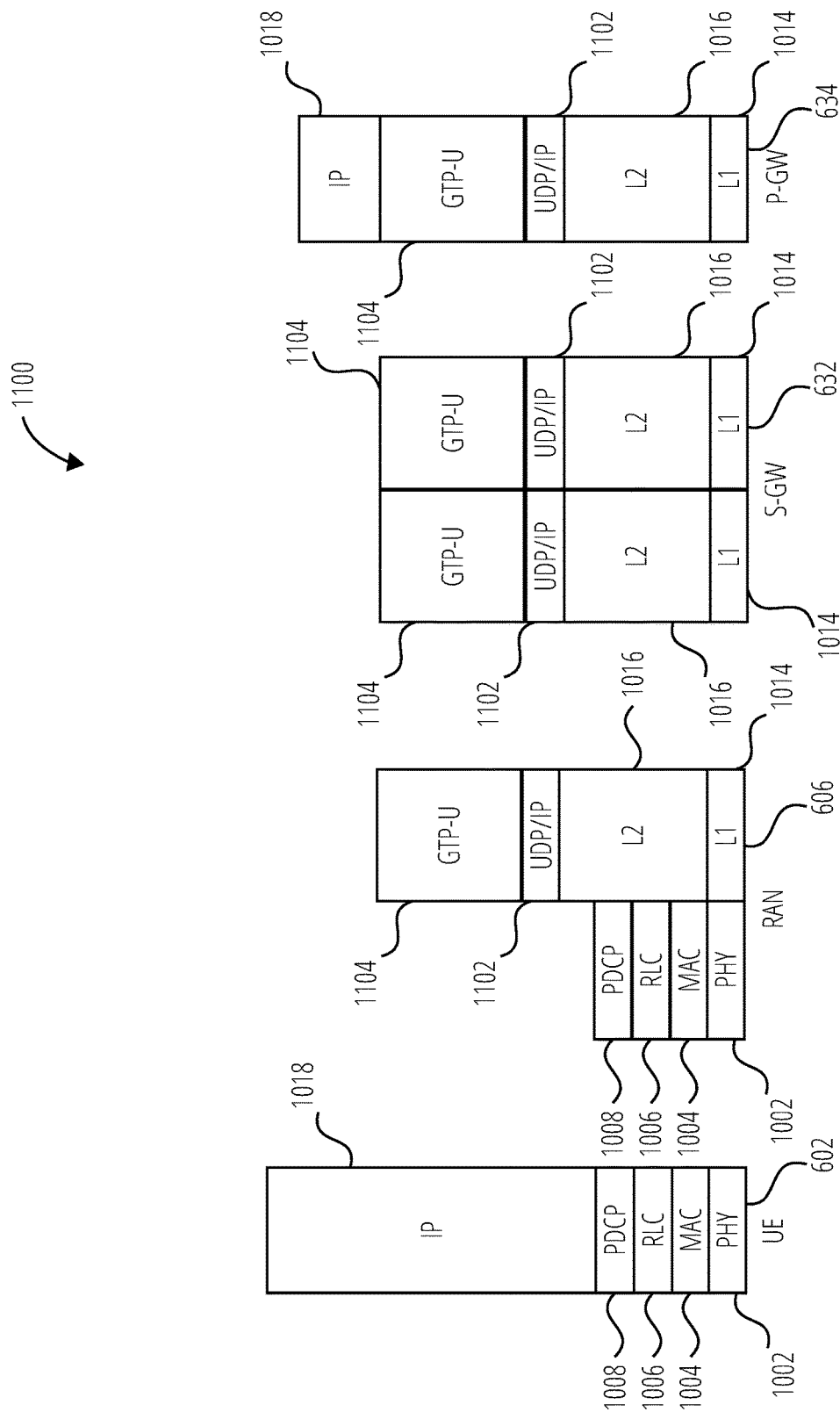
FIG. 11 illustrates a user plane in accordance with one embodiment.

FIG. 11 is an illustration of a user plane protocol stack in accordance with some embodiments. In this embodiment, a user plane 1100 is shown as a communications protocol stack between the UE 602 (or alternatively, the UE 604), the RAN 606 (e.g., the macro RAN node 618 and/or the LP RAN node 620), the S-GW 632, and the P-GW 634. The user plane 1100 may utilize at least some of the same protocol layers as the control plane 1000. For example, the UE 602 and the RAN 606 may utilize a Uu interface (e.g., an LTE-Uu interface) to exchange user plane data via a protocol stack comprising the PHY layer 1002, the MAC layer 1004, the RLC layer 1006, the PDCP layer 1008.

The General Packet Radio Service (GPRS) Tunneling Protocol for the user plane (GTP-U) layer (GTP-U layer 1104) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1102) may provide checksums for data integrity, port numbers for addressing different functions at the source and destination, and encryption and authentication on the selected data flows. The RAN 606 and the S-GW 632 may utilize an S1-U interface to exchange user plane data via a protocol stack comprising the L1 layer 1014, the L2 layer 1016, the UDP/IP layer 1102, and the GTP-U layer 1104. The S-GW 632 and the P-GW 634 may utilize an S5/S8a interface to exchange user plane data via a protocol stack comprising the L1 layer 1014, the L2 layer 1016, the UDP/IP layer 1102, and the GTP-U layer 1104. As discussed above with respect to FIG. 10, NAS protocols support the mobility of the UE 602 and the session management procedures to establish and maintain IP connectivity between the UE 602 and the P-GW 634.

Figure 12:
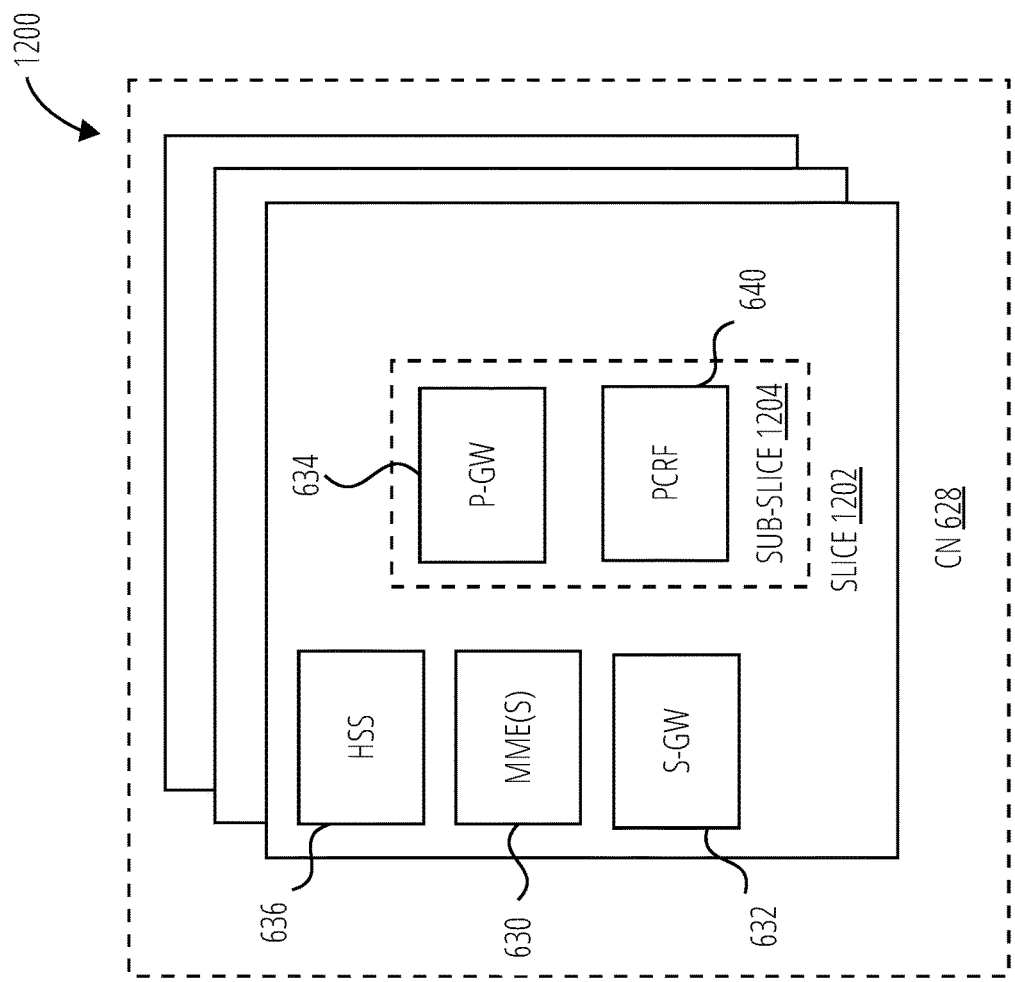
FIG. 12 illustrates components in accordance with one embodiment.

FIG. 12 illustrates components 1200 of a core network in accordance with some embodiments. The components of the CN 628 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 628 may be referred to as a network slice 1202 (e.g., the network slice 1202 is shown to include the HSS 636, tht MME(s) 630, and the S-GW 632). A logical instantiation of a portion of the CN 628 may be referred to as a network sub-slice 1204 (e.g., the network sub-slice 1204 is shown to include the P-GW 634 and the PCRF 640).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 13:
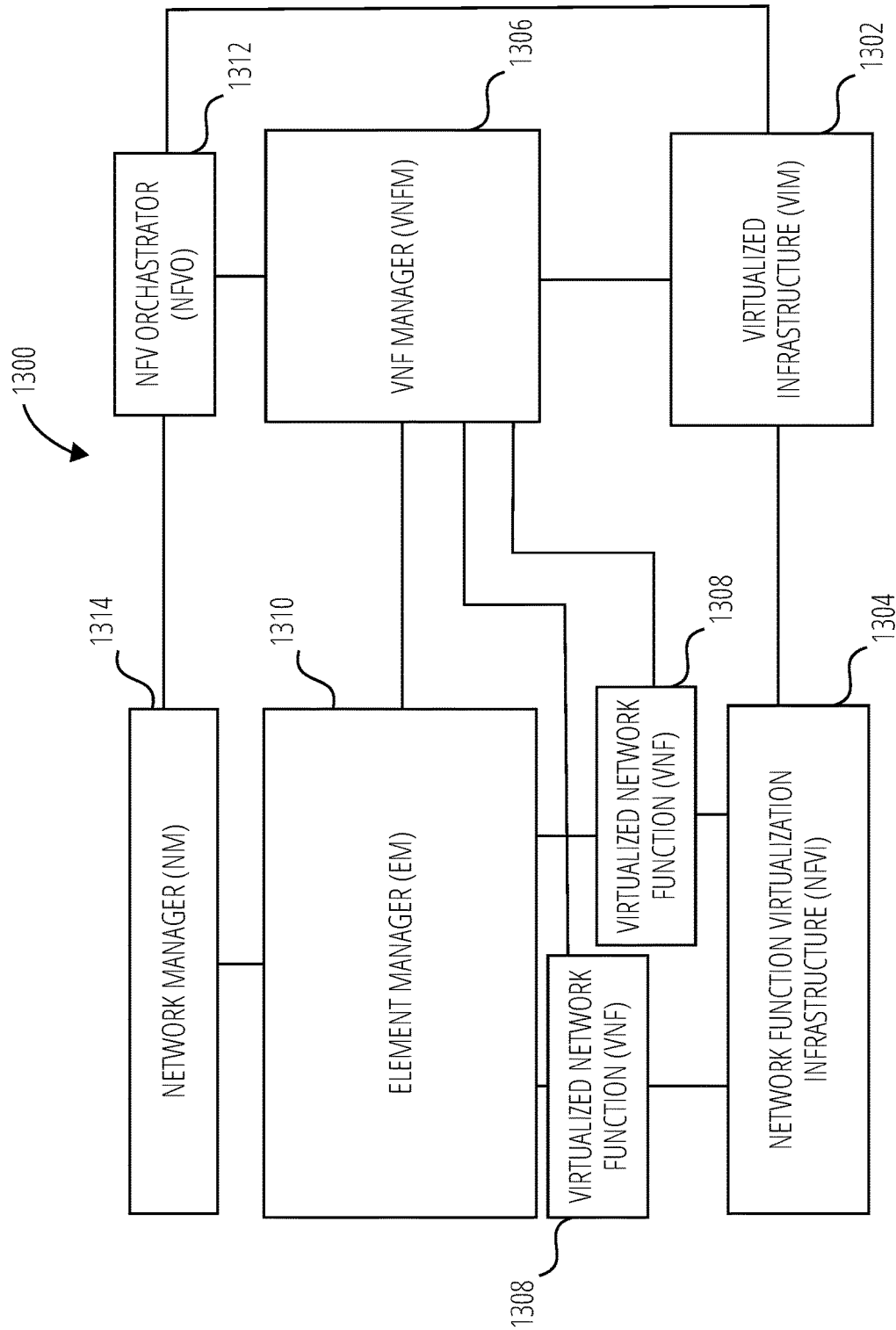
FIG. 13 illustrates a system in accordance with one embodiment.

FIG. 13 is a block diagram illustrating components, according to some example embodiments, of a system 1300 to support NFV. The system 1300 is illustrated as including a virtualized infrastructure manager (shown as VIM 1302), a network function virtualization infrastructure (shown as NFVI 1304), a VNF manager (shown as VNFM 1306), virtualized network functions (shown as VNF 1308), an element manager (shown as EM 1310), an NFV Orchestrator (shown as NFVO 1312), and a network manager (shown as NM 1314).

The VIM 1302 manages the resources of the NFVI 1304. The NFVI 1304 can include physical or virtual resources and applications (including hypervisors) used to execute the system 1300. The VIM 1302 may manage the life cycle of virtual resources with the NFVI 1304 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1306 may manage the VNF 1308. The VNF 1308 may be used to execute EPC components/functions. The VNFM 1306 may manage the life cycle of the VNF 1308 and track performance, fault and security of the virtual aspects of VNF 1308. The EM 1310 may track the performance, fault and security of the functional aspects of VNF 1308. The tracking data from the VNFM 1306 and the EM 1310 may comprise, for example, performance measurement (PM) data used by the VIM 1302 or the NFVI 1304. Both the VNFM 1306 and the EM 1310 can scale up/down the quantity of VNFs of the system 1300.

The NFVO 1312 may coordinate, authorize, release and engage resources of the NFVI 1304 in order to provide the requested service (e.g., to execute an EPC function, component, or slice). The NM 1314 may provide a package of end-user functions with the responsibility for the management of a network, which may include network elements with VNFs, non-virtualized network functions, or both (management of the VNFs may occur via the EM 1310).

Figure 14:
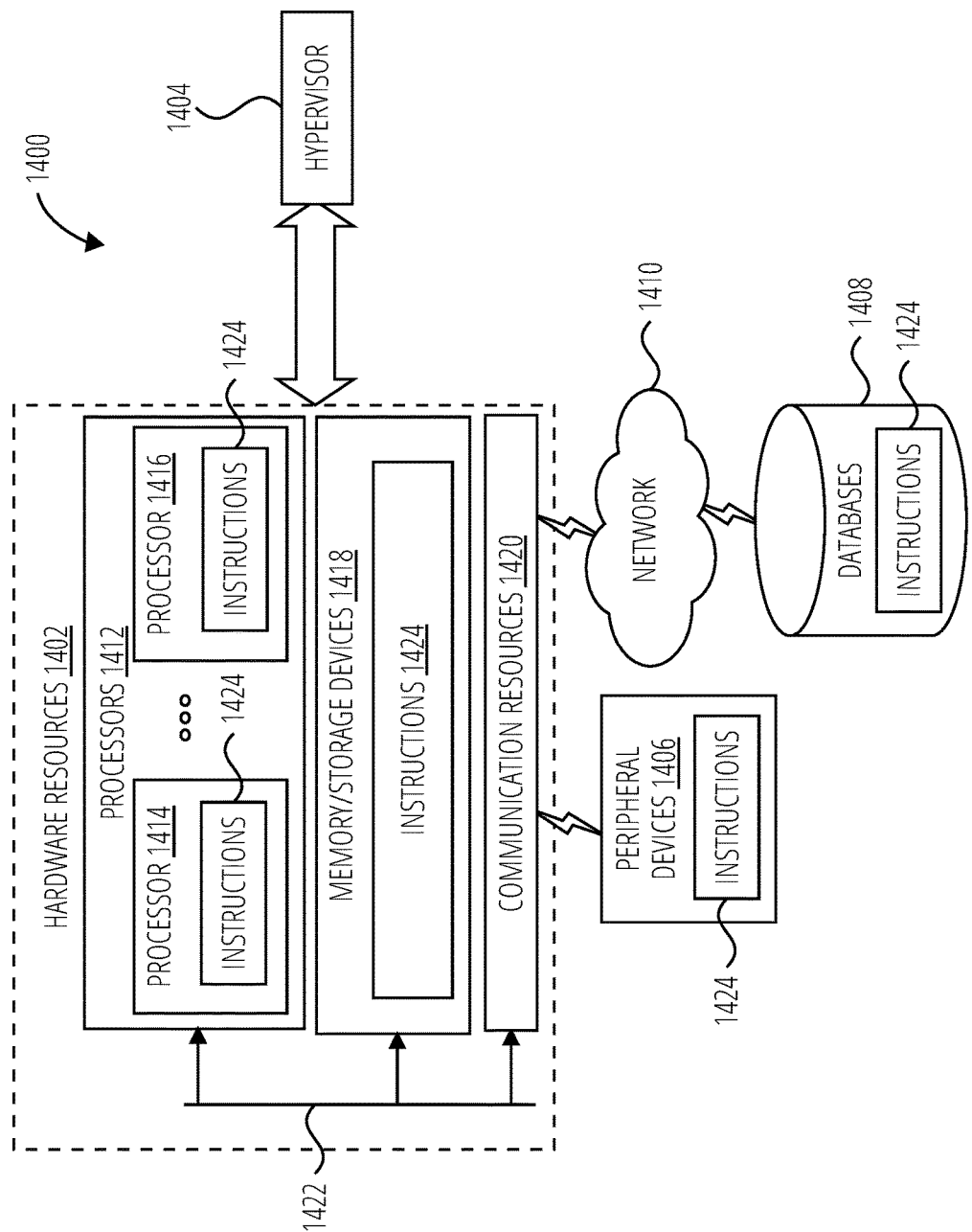
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a test apparatus, a UE, base station, network element, etc. as described above in connection with one or more of the preceding figures may be configured to operate in accordance with one or more of the examples set forth below in the example section.

Example Section

The following examples pertain to further embodiments.

Example 1A may include an 8Rx capable UE configured to reuse legacy 4Rx test cases for 8Rx capable UE testing, wherein the 8Rx capable UE testing comprises new applicability rules.

Example 2A may include the 8Rx capable UE of example 1A and/or some other example(s) herein, wherein for an 8Rx capable UE to be tested in legacy 4Rx tests on any of the 4Rx supported RF bands, 4 out of the 8Rx are connected with data source from the system simulator and the other 4Rx are connected with zero input, depending on a UE declaration and antenna ports configuration, wherein the SNR requirements can be applied with X dB less than the number specified with 4Rx for test configuration with CRS-based transmission modes and with X dB less than the number specified with 4Rx for test configuration with DMRS-based transmission modes. If X=0, it means that same SNR requirements specified with 4Rx should be applied.

Example 3A may include the 8Rx capable UE of example 1A and/or some other example(s) herein, wherein for an 8Rx capable UE to be tested in legacy 4Rx tests on any of the 8Rx supported RF bands, the fading channels from the Tx antennas are reproduced and independent noise is added to each Rx antenna, wherein the SNR requirements should be applied with Y dB less than the number specified with 4Rx for test configuration with CRS-based transmission modes and with Y dB less than the number specified with 4Rx for test configuration with DMRS-based transmission modes, wherein if Y=1.5 dB, it means that when an 8Rx capable UE is tested in legacy 4Rx tests on any of the 8Rx supported RF bands, the 8Rx capable UE can achieve 1.5 dB SNR gains compared to the 4Rx capable UEs.

Example 4A may include the 8Rx capable UE of example 1A and/or some other example(s) herein, wherein the 8Rx capable UE is configured to operate an antenna connection method for applying an 8Rx capable UE to the legacy 4Rx test case with 2Tx, wherein the SNR requirements are to be applied with Y dB less than the number specified with 4Rx for test configuration with CRS-based transmission modes and with Y dB less than the number specified with 4Rx for test configuration with DMRS-based transmission modes, wherein if Y=1.5 dB, then the 8Rx capable UE is tested in legacy 4Rx tests on any of the 8Rx supported RF bands, and the 8Rx capable UE can achieve 1.5 dB SNR gains compared to the 4Rx capable UEs.

Example 5A may include an apparatus comprising means to perform one or more elements of a method described in or related to any of examples 1A-4A, or any other method or process described herein.

Example 6A may include one or more non-transitory computer-readable media comprising instructions to cause an electronic device, upon execution of the instructions by one or more processors of the electronic device, to perform one or more elements of a method described in or related to any of examples 1A-4A, or any other method or process described herein.

Example 7A may include an apparatus comprising logic, modules, or circuitry to perform one or more elements of a method described in or related to any of examples 1A-4A, or any other method or process described herein.

Example 8A may include a method, technique, or process as described in or related to any of examples 1A-4A, or portions or parts thereof.

Example 9A may include an apparatus comprising: one or more processors and one or more computer readable media comprising instructions that, when executed by the one or more processors, cause the one or more processors to perform the method, techniques, or process as described in or related to any of examples 1A-4A, or portions thereof.

Example 10A may include a signal as described in or related to any of examples 1A-4A, or portions or parts thereof.

Example 11A may include a signal in a wireless network as shown and described herein.

Example 12A may include a method of communicating in a wireless network as shown and described herein.

Example 13A may include a system for providing wireless communication as shown and described herein.

Example 14A may include a device for providing wireless communication as shown and described herein.

Example 1B is a testing apparatus for an 8Rx capable user equipment (UE) including eight receive (8Rx) antenna ports The 8Rx capable UE is configured to support up to eight multiple input multiple output (MIMO) reception layers. The testing apparatus includes: a system simulator (SS) comprising a first transmit (Tx) port and a second Tx port; a first splitter coupled to the first Tx port; a second splitter coupled to the second Tx port; four first faders coupled to respective outputs of the first splitter; four second faders coupled to respective outputs of the second splitter; four first combiners, each of the first combiners coupled to one of the first faders and one of second faders, wherein each of the first faders is coupled to one of the first combiners, and wherein each of the second faders is coupled to one of the firsts combiners; four third splitters respectively coupled to a corresponding output of the four first combiners; and eight second combiners configured to add respective outputs of the third splitters to independent noise for each of the 8Rx antenna ports.

Example 2B includes the testing apparatus of example 1B, wherein the independent noise for each of the 8Rx antenna ports comprises additive white Gaussian noise (AWGN).

Example 3B includes the testing apparatus of example 1B, further comprising a controller configured to perform one or more tests for a 4Rx capable UE including four receive (4Rx) antenna ports on the 8Rx capable UE.

Example 4B includes the testing apparatus of example 3B, wherein to perform the one or more tests, the controller is further configured to: select a 4Rx supported radio frequency (RF) band based on a declaration of the 8Rx capable UE; provide four of the 8Rx antenna ports with data from the SS modulated onto the 4Rx supported RF band and provide zero input to another four of the 8Rx antenna ports; determine one or more performance parameters of the 8Rx capable UE's ability to receive the data on the 4Rx supported RF band; and apply a same set of test criteria specified by the one or more tests for the 4Rx capable UE to measurements of the one or more performance parameters of the 8Rx capable UE's ability to receive the data on the 4Rx supported RF band.

Example 5B includes the testing apparatus of example 4B, wherein the test criteria includes a signal to noise ratio (SNR) requirement.

Example 6B includes the testing apparatus of example 3B, wherein to perform the one or more tests, the controller is further configured to: select an 8Rx supported radio frequency (RF) band based on a declaration of the 8Rx capable UE; provide each of the 8Rx antenna ports with data from the SS modulated onto the 8Rx supported RF band; determine one or more performance parameters of the 8Rx capable UE's ability to receive the data on the 8Rx supported RF band; and apply a signal to noise ratio (SNR) criteria with 1.5 dB less than an SNR requirement specified in the one or more tests for the 4Rx capable UE.

Example 7B includes the testing apparatus of example 3B, wherein the one or more tests for the 4Rx capable UE includes a demodulation test.

Example 8B is a method of testing an 8Rx capable user equipment (UE) including eight receive (8Rx) antenna ports, the 8Rx capable UE configured to support up to eight multiple input multiple output (MIMO) reception layers. The method includes: establishing a connection from a first transmit (Tx) source and a second Tx source to each of the 8Rx antenna ports, wherein the connection: duplicates a fading channel from both the first Tx source and the second Tx source to each of the eight Rx antenna ports; and adds independent noise for each of the 8Rx antenna ports. The method further includes testing the 8Rx capable UE through the connection using one or more test cases for a 4Rx capable UE including four receive (4Rx) antenna ports.

Example 9B includes the method of example 8B, wherein the testing comprises: selecting a 4Rx supported radio frequency (RF) band based on a declaration of the 8Rx capable UE; through the connection, providing a first antenna set comprising a first four of the 8Rx antenna ports with data from a system simulator modulated onto the 4Rx supported RF band; providing zero input to a second antenna set comprising a second four of the 8Rx antenna ports, the second four being different than the first four; measuring one or more performance parameters of the 8Rx capable UE's ability to receive the data on the 4Rx supported RF band; and applying a same set of test criteria specified by the one or more test cases for the 4Rx capable UE to measurements of the one or more performance parameters of the 8Rx capable UE's ability to receive the data on the 4Rx supported RF band.

Example 10B includes the method of example 9B, wherein the one or more test cases for the 4Rx capable UE includes a demodulation test, and wherein the test criteria includes a signal to noise ratio (SNR) requirement.

Example 11B includes the method of example 9B, further comprising selecting the first four of the 8Rx antenna ports and the second four of the 8Rx antenna ports based on the declaration and an antenna ports configuration of the 8Rx capable UE.

Example 12B includes the method of example 8B, wherein the testing comprises: selecting an 8Rx supported radio frequency (RF) band based on a declaration of the 8Rx capable UE; through the connection, providing each of the 8Rx antenna ports with data from a system simulator modulated onto the 8Rx supported RF band; measuring one or more performance parameters of the 8Rx capable UE's ability to receive the data on the 8Rx supported RF band; and applying a signal to noise ratio (SNR) criteria with 1.5 dB less than an SNR requirement specified in the one or more test cases for the 4Rx capable UE.

Example 13B includes the method of example 12B, wherein the one or more test cases for the 4Rx capable UE includes a demodulation test.

Example 14B includes the method of example 8B, wherein establishing the connection comprises: splitting the first Tx source into respective inputs of first faders in a first set of four faders; splitting the second Tx source into respective inputs of second faders in a second set of four faders; combining an output of each of the first faders with a respective output of a different corresponding one of the second faders to generate four duplicated fading channels; and splitting each of the four duplicated fading channels before adding the independent noise for each of the 8Rx antenna ports.

Example 15B is a testing apparatus, comprising: means for generating signals from two transmit (Tx) antennas; means for duplicating a fading channel from each of the two Tx antennas for eight receive (8Rx) antennas of an 8Rx capable user equipment (UE); means for adding independent noise to each of the 8Rx antennas; and means for testing the 8Rx capable UE using one or more test cases for a 4Rx capable UE including four receive (4Rx) antennas.

Example 16B includes the testing apparatus of example 15B, wherein the independent noise comprises additive white Gaussian noise (AWGN).

Example 17B includes the testing apparatus of example 15B, wherein the means for duplicating the fading channel from each of the two Tx antennas for each of the 8Rx antennas comprises: means for splitting the signals from each of the two Tx antennas; means for simulating channel fading; means for summing faded channels from each of the two Tx antennas to generate four duplicated fading channels; and means for splitting the four duplicated fading channels into eight duplicated fading channels.

Example 18B includes the testing apparatus of example 15B, wherein the means for testing comprises means for: selecting a 4Rx supported radio frequency (RF) band based on a declaration of the 8Rx capable UE; providing four of the 8Rx antennas with data from the means for generating signals modulated onto the 4Rx supported RF band and providing zero input to another four of the 8Rx antennas; determining one or more performance parameters of the 8Rx capable UE's ability to receive the data on the 4Rx supported RF band; and applying a same set of test criteria specified by the one or more tests for the 4Rx capable UE to measurements of the one or more performance parameters of the 8Rx capable UE's ability to receive the data on the 4Rx supported RF band.

Example 19B includes the testing apparatus of example 18B, wherein the test criteria includes a signal to noise ratio (SNR) requirement.

Example 20B includes the testing apparatus of example 15B, wherein the means for testing comprises means for: selecting an 8Rx supported radio frequency (RF) band based on a declaration of the 8Rx capable UE; providing each of the 8Rx antennas with data from the means for generating signals modulated onto the 8Rx supported RF band; determining one or more performance parameters of the 8Rx capable UE's ability to receive the data on the 8Rx supported RF band; and applying a signal to noise ratio (SNR) criteria with 1.5 dB less than an SNR requirement specified in the one or more tests for the 4Rx capable UE.

Example 21B includes the testing apparatus of example 15B, wherein the one or more tests for the 4Rx capable UE includes a demodulation test.

Example 22B is a non-transitory computer-readable storage medium including instructions that, when processed by a processor, configure the processor to perform the method of any of examples 8B-14B.

Example 23B is a computing apparatus including a processor and a memory storing instructions that, when executed by the processor, configure the apparatus to perform the method of any of examples 8B-14B.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A testing apparatus for an 8Rx capable user equipment (UE) including eight receive (8Rx) antenna ports, the 8Rx capable UE configured to support up to eight multiple input multiple output (MIMO) reception layers, the testing apparatus comprising:
    a system simulator (SS) comprising a first transmit (Tx) port and a second Tx port;
    a first splitter coupled to the first Tx port;
    a second splitter coupled to the second Tx port;
    four first faders coupled to respective outputs of the first splitter;
    four second faders coupled to respective outputs of the second splitter;
    four first combiners, each of the first combiners coupled to one of the first faders and one of second faders, wherein each of the first faders is coupled to one of the first combiners, and wherein each of the second faders is coupled to one of the firsts combiners;
    four third splitters respectively coupled to a corresponding output of the four first combiners; and
    eight second combiners configured to add respective outputs of the third splitters to independent noise for each of the 8Rx antenna ports.

2. The testing apparatus of claim 1, wherein the independent noise for each of the 8Rx antenna ports comprises additive white Gaussian noise (AWGN).

3. The testing apparatus of claim 1, further comprising a controller configured to perform one or more tests for a 4Rx capable UE including four receive (4Rx) antenna ports on the 8Rx capable UE.

4. The testing apparatus of claim 3, wherein to perform the one or more tests, the controller is further configured to:
    select a 4Rx supported radio frequency (RF) band based on a declaration of the 8Rx capable UE;
    provide four of the 8Rx antenna ports with data from the SS modulated onto the 4Rx supported RF band and provide zero input to another four of the 8Rx antenna ports;
    determine one or more performance parameters of the 8Rx capable UE's ability to receive the data on the 4Rx supported RF band; and
    apply a same set of test criteria specified by the one or more tests for the 4Rx capable UE to measurements of the one or more performance parameters of the 8Rx capable UE's ability to receive the data on the 4Rx supported RF band.

5. The testing apparatus of claim 4, wherein the test criteria includes a signal to noise ratio (SNR) requirement.

6. The testing apparatus of claim 3, wherein to perform the one or more tests, the controller is further configured to:
    select an 8Rx supported radio frequency (RF) band based on a declaration of the 8Rx capable UE;
    provide each of the 8Rx antenna ports with data from the SS modulated onto the 8Rx supported RF band;
    determine one or more performance parameters of the 8Rx capable UE's ability to receive the data on the 8Rx supported RF band; and
    apply a signal to noise ratio (SNR) criteria with 1.5 dB less than an SNR requirement specified in the one or more tests for the 4Rx capable UE.

7. The testing apparatus of claim 3, wherein the one or more tests for the 4Rx capable UE includes a demodulation test.

8. A method of testing an 8Rx capable user equipment (UE) including eight receive (8Rx) antenna ports, the 8Rx capable UE configured to support up to eight multiple input multiple output (MIMO) reception layers, the method comprising:
    establishing a connection from a first transmit (Tx) source and a second Tx source to each of the 8Rx antenna ports, wherein the connection:
        duplicates a fading channel from both the first Tx source and the second Tx source to each of the eight Rx antenna ports; and
        adds independent noise for each of the 8Rx antenna ports; and
    testing the 8Rx capable UE through the connection using one or more test cases for a 4Rx capable UE including four receive (4Rx) antenna ports,
    wherein establishing the connection comprises:
        splitting the first Tx source into respective inputs of first faders in a first set of four faders;
        splitting the second Tx source into respective inputs of second faders in a second set of four faders;
        combining an output of each of the first faders with a respective output of a different corresponding one of the second faders to generate four duplicated fading channels; and
    splitting each of the four duplicated fading channels before adding the independent noise for each of the 8Rx antenna ports.

9. The method of claim 8, wherein the testing comprises:
    selecting a 4Rx supported radio frequency (RF) band based on a declaration of the 8Rx capable UE;
    through the connection, providing a first antenna set comprising a first four of the 8Rx antenna ports with data from a system simulator modulated onto the 4Rx supported RF band;
    providing zero input to a second antenna set comprising a second four of the 8Rx antenna ports, the second four being different than the first four;

measuring one or more performance parameters of the 8Rx capable UE's ability to receive the data on the 4Rx supported RF band; and applying a same set of test criteria specified by the one or more test cases for the 4Rx capable UE to measurements of the one or more performance parameters of the 8Rx capable UE's ability to receive the data on the 4Rx supported RF band.

10. The method of claim 9, wherein the one or more test cases for the 4Rx capable UE includes a demodulation test, and wherein the test criteria includes a signal to noise ratio (SNR) requirement.

11. The method of claim 9, further comprising selecting the first four of the 8Rx antenna ports and the second four of the 8Rx antenna ports based on the declaration and an antenna ports configuration of the 8Rx capable UE.

12. The method of claim 8, wherein the testing comprises:
selecting an 8Rx supported radio frequency (RF) band based on a declaration of the 8Rx capable UE;
through the connection, providing each of the 8Rx antenna ports with data from a system simulator modulated onto the 8Rx supported RF band;
measuring one or more performance parameters of the 8Rx capable UE's ability to receive the data on the 8Rx supported RF band; and
applying a signal to noise ratio (SNR) criteria with 1.5 dB less than an SNR requirement specified in the one or more test cases for the 4Rx capable UE.

13. The method of claim 12, wherein the one or more test cases for the 4Rx capable UE includes a demodulation test.

14. A testing apparatus, comprising:
means for generating signals from two transmit (Tx) antennas;
means for duplicating a fading channel from each of the two Tx antennas for eight receive (8Rx) antennas of an 8Rx capable user equipment (UE), wherein the means for duplicating comprises:
means for splitting the signals from each of the two Tx antennas;
means for simulating channel fading;
means for summing faded channels from each of the two Tx antennas to generate four duplicated fading channels; and
means for splitting the four duplicated fading channels into eight duplicated fading channels;

means for adding independent noise to each of the 8Rx antennas; and
means for testing the 8Rx capable UE using one or more test cases for a 4Rx capable UE including four receive (4Rx) antennas.

15. The testing apparatus of claim 14, wherein the independent noise comprises additive white Gaussian noise (AWGN).

16. The testing apparatus of claim 14, wherein the means for testing comprises means for:
selecting a 4Rx supported radio frequency (RF) band based on a declaration of the 8Rx capable UE;
providing four of the 8Rx antennas with data from the means for generating signals modulated onto the 4Rx supported RF band and providing zero input to another four of the 8Rx antennas;
determining one or more performance parameters of the 8Rx capable UE's ability to receive the data on the 4Rx supported RF band; and
applying a same set of test criteria specified by the one or more tests for the 4Rx capable UE to measurements of the one or more performance parameters of the 8Rx capable UE's ability to receive the data on the 4Rx supported RF band.

17. The testing apparatus of claim 16, wherein the test criteria includes a signal to noise ratio (SNR) requirement.

18. The testing apparatus of claim 14, wherein the means for testing comprises means for:
selecting an 8Rx supported radio frequency (RF) band based on a declaration of the 8Rx capable UE;
providing each of the 8Rx antennas with data from the means for generating signals modulated onto the 8Rx supported RF band;
determining one or more performance parameters of the 8Rx capable UE's ability to receive the data on the 8Rx supported RF band; and
applying a signal to noise ratio (SNR) criteria with 1.5 dB less than an SNR requirement specified in the one or more tests for the 4Rx capable UE.

19. The testing apparatus of claim 14, wherein the one or more tests for the 4Rx capable UE includes a demodulation test.

* * * * *